United States Patent

Steed

[15] 3,641,452

[45] Feb. 8, 1972

[54] PI-COUPLED LOW-NOISE AMPLIFIER

[72] Inventor: Willie L. Steed, 6812 Lynbrook Drive, Springfield, Va. 22150

[22] Filed: July 2, 1970

[21] Appl. No.: 51,927

[52] U.S. Cl. ....................................330/176, 330/70, 330/35

[51] Int. Cl. ...........................................................H03f 1/00

[58] Field of Search .................330/176, 178, 149, 158, 70 C, 330/35 C

[56] References Cited

UNITED STATES PATENTS 3,451,003 6/1969 Rheinfelder .......................330/178 X 2,524,821 10/1950 Montgomery.......................330/178 X 2,264,879 12/1941 Heinecke...............................330/178

*Primary Examiner*—Nathan Kaufman

*Attorney*—R. S. Sciascia and Q. E. Hodges

[57] ABSTRACT

Two stages of a series cascade amplifier are coupled by a Pi network. The amplifier stages may be grounded grid in the case of vacuum tube or grounded gate where the stages are field effect transistors. The Pi network coupling, cooperating with the stages in a stable grounded grid or grounded gate configurations allows the impedance of the Pi network to be adjusted for lowest noise with immunity from oscillation.

10 Claims, 5 Drawing Figures

INVENTOR.
WILLIE L. STEED
BY O. P. Hodges
ATTORNEY

INVENTOR.
WILLIE L. STEED
BY [signature]
ATTORNEY

PI-COUPLED LOW-NOISE AMPLIFIER

The invention described herein may be manufactured and used by or for the Government of the United States of America for governmental purposes without the payment of any royalties thereon or therefor.

BACKGROUND OF THE INVENTION

Pi network coupling between two stages of a series cascade amplifier with grounded cathodes have been successfully employed for several years and is technically straightforward. However, a cascade amplifier because of interelement capacitive coupling in grounded cathode configuration is prone to instability and oscillation. Adjusting the Pi network for high impedance and high gain causes feedback through the interelement capacitive coupling and resulting oscillation. Too little impedance or inductance in the Pi network causes noise to be excessive. It is troublesome to build and adjust the cascade amplifier for lowest noise, requiring high impedance, and for oscillation free operation as the oscillation is caused by the high impedance of the Pi network and stage interelement capacitive coupling.

The new and unusual result of the Pi-coupled grounded grid or gate amplifier is its stable and oscillation free performance when the Pi network impedance is adjusted to yield high signal to noise ratios.

This circuit can be easily adjusted for the lowest noise content whereas in prior art cascaded amplifiers, a fine line of adjustment existed between stability and low noise. The fine line meant that the adjustment of the series inductance in the Pi network for maximum signal to noise ratio had to be approached with extreme care. The sensitivity of the adjustment was such that a minute increment of inductance could result in feedback oscillation through the interelement capacitive couplings. The grounded grid or grounded gate cascade amplifier represents a sufficient increase in stability to allow the amplifier to be adjusted for maximum signal to noise ratio without incurring instability.

Accordingly, it is one object of this invention to build a cascaded amplifier capable of an adjustment for minimum noise without incurring unstable operation.

DESCRIPTION OF THE PREFERRED EMBODIMENTS

Figures 1, 1A, 2:
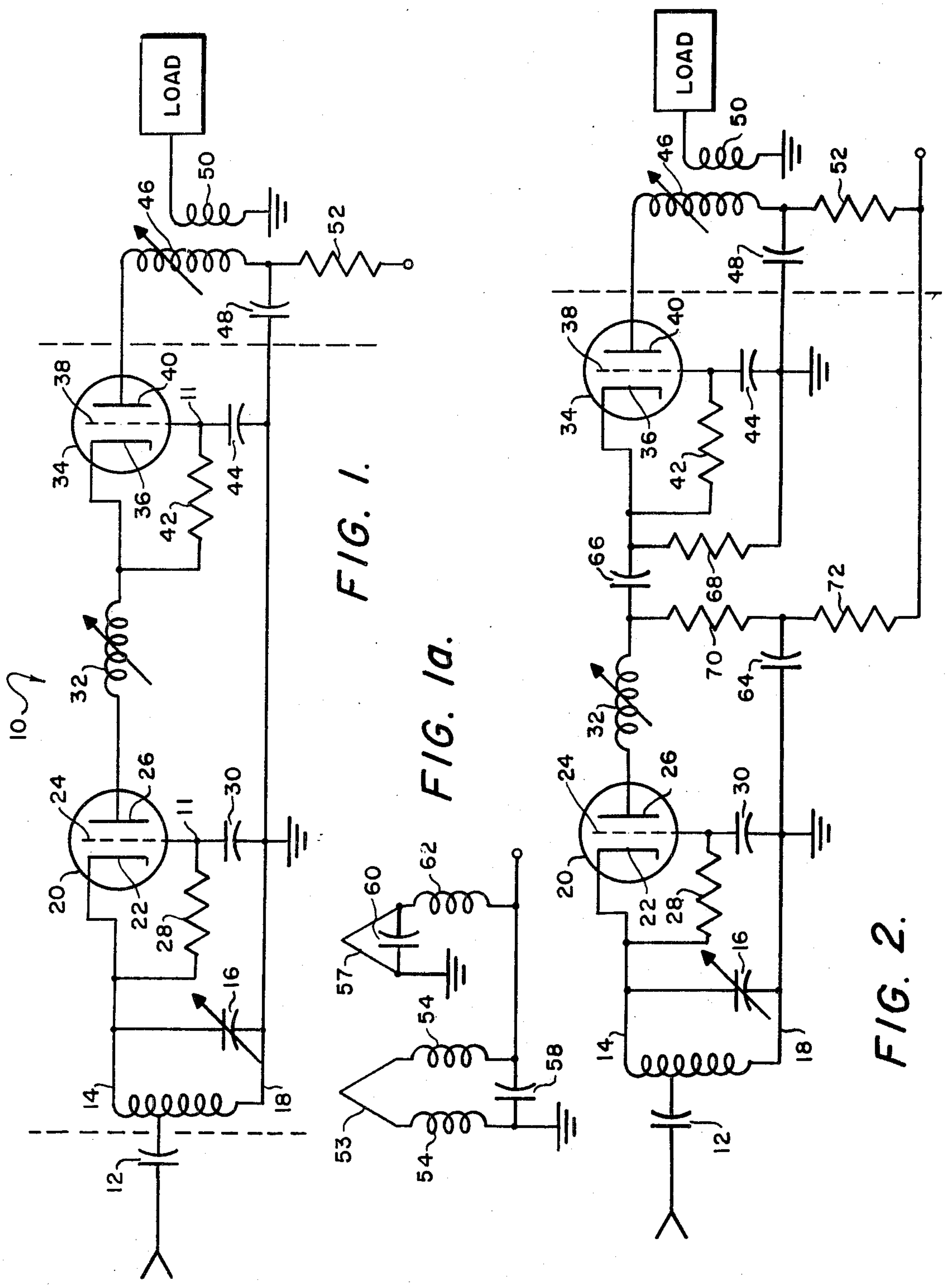
FIG. 1 shows a cascaded amplifier using vacuum tubes and grounded grid configuration and with the stages in series for signal voltage and for DC supply voltage.
FIG. 1*a* shows the vacuum tube filament connection for the circuits of FIGS. 1 and 2.
FIG. 2 shows a circuit of FIG. 1 with the stages arranged in series for signal voltage and in parallel for DC supply voltage.

Referring now to FIG. 1, the cascaded amplifier utilizing vacuum tubes in a grounded grid configuration is shown to include coupling capacitor 12 coupling the antenna to the input band-pass filter 14, filter 14 comprising variable capacitor 16 cooperating with inductance 18 to form a band-pass filter at the signal frequency so that only signals of desired frequencies will be passed to the amplifier. First-stage vacuum tube 20 contains cathode 22, grid 24 and plate 26. Cathode 22 is connected to filter 14 and to resistance 28. Resistance 28 is connected between cathode 22 and grid 24 and the voltage developed across resistance 28 provides bias potential for the first stage. Capacitor 30 is connected from grid 24 to ground and is a ground for RF signals. Tuned inductance 32 forms the series element of the Pi network and couples signals at RF frequency of the first stage 20 to the second-stage vacuum tube 34. Second stage 34 includes cathode 36, grid 38 and plate 40. Inductance 32 is connected to cathode 36. Resistance 42 is connected from cathode 36 to grid 38 and provides bias potential to cathode 36. Capacitance 44 connected from the grid 38 of the second stage to ground is a bypass capacitor for RF tuned inductance 46 resonates with the plate to grid capacitance of the second stage to form a band-pass filter at the signal frequency. Capacitors 48 connected between inductance 46 and ground is a bypass capacitor to ground for RF and blocks the power supply DC. Inductance 50 couples the RF signal from the tuned circuit of inductance 46, the combination of inductances 46 and 50 providing a transformer, coupling the signal between the output of the second stage and the load. Dropping resistor 52 is connected from the DC supply to the tuned inductance 46.

FIG. 1*a* shows the connections of the filaments for the first and second stage. The filaments are connected in parallel to a suitable DC source. The filament 55 of the first stage 20 is isolated from ground at RF by radiofrequency chokes 54 and RF bypass capacitor 58. The filament 57 of the second stage is decoupled from the filament of the first stage, at RF, by radiofrequency choke 62 and RF bypass capacitor 60.

Referring now to FIG. 2, the cascaded amplifier is shown similar to the cascaded amplifier in FIG. 1 wherein like reference characters designate like or corresponding parts. FIG. 2 is shown to additionally include coupling capacitor 66 for coupling the RF signal from the first stage to the second stage while providing DC isolation between stages. Bypass capacitor 64 provides an RF bypass circuit to ground. Resistance 68 provides a DC path from the cathode of the second stage to the ground. Resistance 70 furnishes a DC path to the plate 26 of the first stage. Resistance 72 is a dropping resistance and in cooperation with dropping resistor 52 provides RF isolation between the two stages.

In the circuit of FIG. 1 the DC voltage drop across the two series-connected stages will be substantially equal. For the circuit of FIG. 2 the two stages are in parallel relative to the power supply and the parallel vacuum tubes may have a lower breakdown voltage rating between the filament and cathode than breakdown rating of the second stage of the series circuit. In the case of the circuit of FIG. 2, half the supply voltage need be used for this embodiment than that used for the circuit shown in FIG. 1, but the circuit of FIG. 2 requires twice the current than is required by the circuit of FIG. 1. A suitable vacuum type for use in the circuits of FIGS. 1 and 2 is 6ES8.

Figure 3:
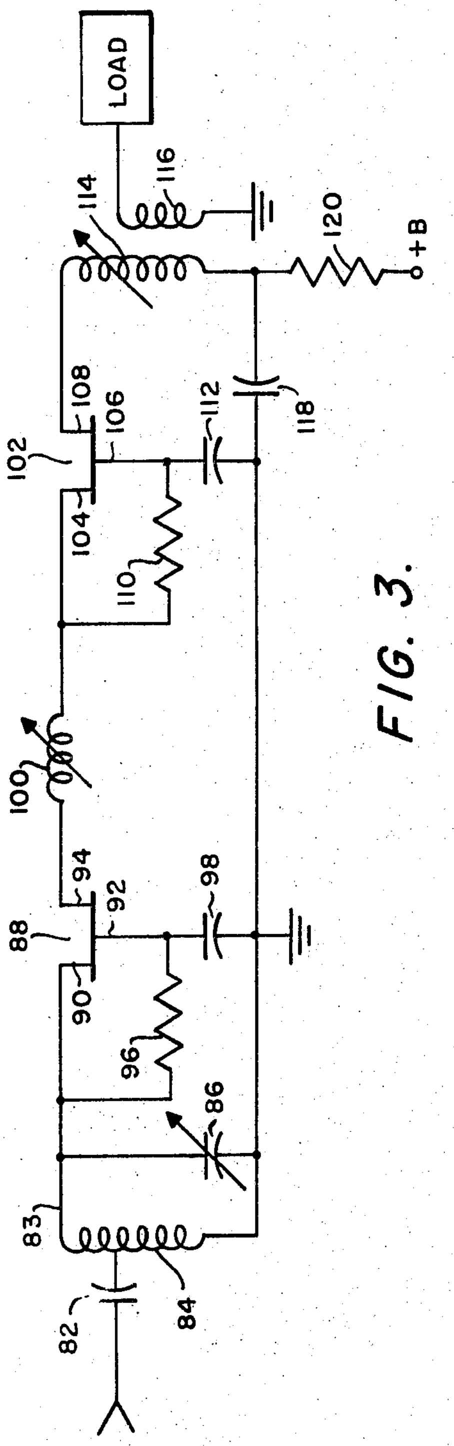
FIG. 3 shows the cascade amplifier utilizing field effect transistors for each stage, in a grounded gate configuration, and with the stages in series for signal voltage and DC supply voltage.

Referring now to FIG. 3 the Pi-coupled low-noise amplifier utilizing field effect transistors is shown to include capacitor 82 coupling the antenna to band-pass filter 83. Band-pass filter 83 includes inductance 84 and variable capacitor 86. Variable capacitor 86 cooperates with inductance 84 to tune band-pass filter 83 to the signal frequency. Connected to band-pass filter 83 is field effect transistor 88 having collector 94, gate 92 and source 90. Connected between gate 92 and ground is RF bypass capacitor 98. Resistance 96 connected between the source 90 and gate 92 provides bias potential to the gate 98. Connected to the collector 94 of the first stage field effect transistor 98 is variable inductance 100. Connected to the opposite side of inductance 100 is field effect transistor 102 having source 104, gate 106 and collector 108. Connected to gate 106 is RF bypass capacitor 112. Resistance 110 connected between source 104 and gate 106 provides bias potential for the gate. Variable inductance 114 is connected to the collector 108 and, cooperating with the interelectro capacitance of the field effect transistor 102, forms a tuned band-pass circuit at the RF signal frequency. Inductance 116 couples the signal from inductance 114 to the load and the combination of inductance 114 and inductance 116 forms a transformer coupling circuit between the collector of field effect transistor 102 and the load. Capacitance 118 connected between ground and the inductance 114 is a RF bypass and DC blocking capacitor and resistance 120 is a RF voltage dropping resistance providing power supply isolation.

Figure 4:
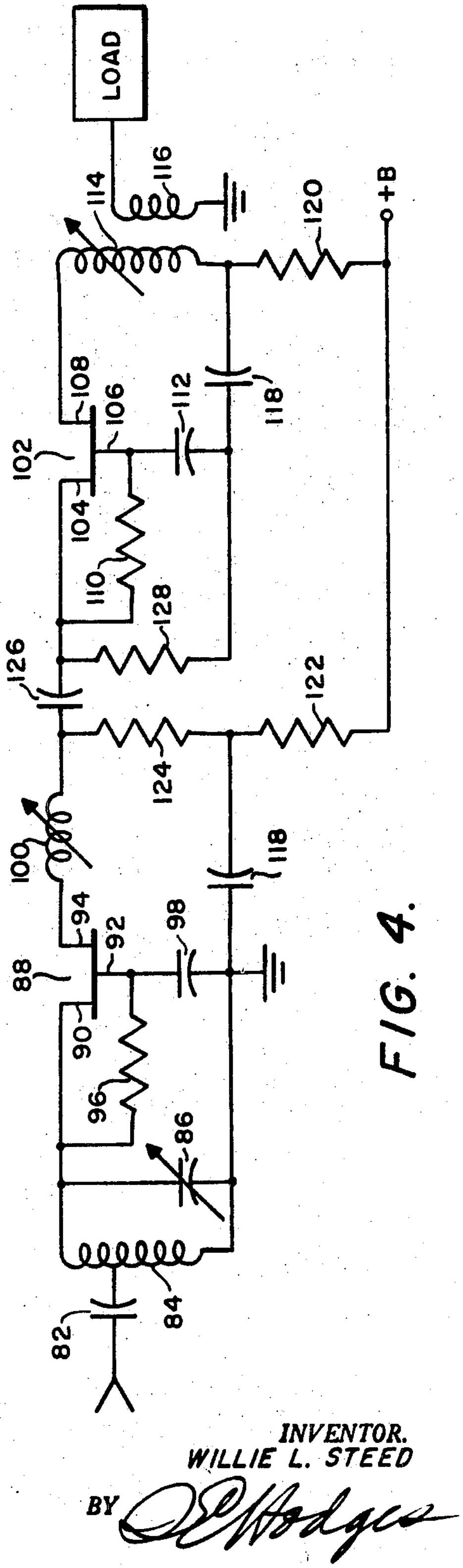
FIG. 4 shows the circuit of FIG. 3 with the stages in series for signal voltage and parallel for DC supply voltage.

Referring now to FIG. 4 the Pi-coupled low-noise amplifier using field effect transistors is substantially as shown in FIG. 3 with like reference characters designating like or corresponding parts. The circuit of FIG. 4 includes additional resistance 124 providing a DC path to the collector of field effect transistor 88. Capacitance 126 is a coupling capacitor and isolates the source of field effect transistor 102 from the DC power supply. Resistance 128 provides DC path to ground for the source of field effect transistor 102 and resistance 120 is a voltage dropping resistance in the power supply circuit and cooperates with resistance 122 to provide isolation between the two stages. A suitable field effect transistor for use in the circuits of FIGS. 3 and 4 is an MFP–102 made by Motorola Corp.

ADJUSTMENTS OF THE AMPLIFIER FOR LOWEST NOISE

With the amplifier connected to a special load circuit for adjustment, having a variable gain RF stage, a converter detector and audio amplifier states, the amplifier is tuned to receive a weak AM signal. Variable inductance 32 is then adjusted until the signal is most readable. This will occur at the highest signal-to-noise ratio. If the inductance is increased beyond this point where the signal is most readable the noise will be increased and the signal readability reduced. As the signal becomes more readable with a continuous adjustment of variable inductance 32 the input signal should be reduced to a point of readability so that the effect of changing variable inductance 32 will be most discernable. This procedure can also be followed using a signal generator in place of a broadcast signal.

A second mode of adjustment utilizes a load, as used in the foregoing method of adjustment, connected to the output of the cascade amplifier and a noise generator as the signal source, connected to the input of the amplifier. The noise generator is initially left unenergized. With the RF gain at minimum the audio gain of the audio amplifier is turned to maximum and an audio output meter of AC voltmeter is connected to the output of the audio amplifier. The RF gain control is then set so that the DC voltmeter reads about one-third scale. The noise generator is then turned on and adjusted until the output of the audio amplifier indicates two-thirds scale. The noise generator is then turned off and variable inductance 32 is adjusted approximately two turns in one direction, at this point it may be necessary to readjust the gain of the receiver to return the meter indication to one-third scale reference point. Now the noise generator is turned on and if the AC voltmeter indicates above the two-thirds scale reference point the adjustment of variable inductance 32 was in the correct direction to reduce the noise. If the meter indicated less than two-thirds scale then variable inductance 32 was adjusted in the wrong direction and must be adjusted in the opposite direction. This procedure may be repeated several times until the adjustment of 32 no longer reduces the noise figure of the amplifier. Adjustment of 32 for lowest noise figure will be broad and not critical.

It is to be understood that the foregoing illustrative embodiments are not intended to be exhaustive nor limiting the present invention but on the contrary are given for the purpose of illustration in order that others skilled in the art may fully understand the invention in the manner of applying the invention to practical use so that they may modify and adapt it in various forms each as may best be suited to the conditions of the particular use.

What is claimed is:

1. A Pi-coupled low-noise amplifier comprising:
a variable impedance means;
means to receive an input signal;
a load connecting means;
a first valve means having an input means, an output means and a control means;
a first and second impedance means;
said input means of said first valve means connected to said signal-receiving means, said output means of said first valve means connected to said variable impedance;
said first impedance means connected between said input means and said control means of said first valve means and biasing said control means whereby the output of said first valve means is responsive to the signal received by said receiving means;
a second valve means having an input means, an output means and a control means;
said variable impedance means being connected to said input means of said second valve means at an end of said variable impedance opposite the end connected to said first valve means;
said output means of said second valve means connected to said load-connecting means and said second impedance means connected between said input means and said control means of said second valve means and biasing said control means whereby the output of said second valve means is responsible to the signal at the output means of said first valve means;
a first and second RF bypass means connected between said control means of said first and second valve means respectively and ground; and
said bypass means connecting said control means to ground at the signal frequency and isolating the control means from ground and frequencies below RF whereby the variable impedance means can be adjusted for minimum noise without incurring feedback isolation.

2. The Pi-coupled amplifier of claim 1 wherein said variable impedance is a variable inductance, said first valve means being a vacuum tube having a grid, cathode and plate, said input means being the cathode, said control means being the grid and said output means being the plate;
said second valve means being a vacuum tube having a cathode grid and plate, said input means being the cathode, said control means being the grid, said output means being the plate;
said variable impedance means is a variable inductance and is connected between the plate of said first vacuum tube and the cathode of said second vacuum tube;
said first impedance means is a resistance connected between said cathode of said first vacuum tube and said grid of said first vacuum tube;
said resistance biasing said first vacuum tube in response to the input signal;
said second impedance means is a resistance connected between said cathode and said grid of said second vacuum tube, said resistance biasing said grid of said second vacuum tube in response to the output of said first vacuum tube, said output means including a variable inductance and a coupling coil connected to a load, said variable inductance and said coupling coil cooperating to form a transformer at said signal frequency; and
said receiving means being a parallel tuned resonant tuned circuit including an inductance and variable capacitance which cooperates with said inductance to form a parallel resonance circuit at said signal frequency.

3. The Pi-coupled amplifier of claim 1 wherein said first valve means is a first field effect transistor having a collector, gate and source, said collector being the output means, said gate being the control means and said source being the input means, said source connected to said receiving means, said gate responsive to said input signal and controlling the output of said first field effect transistor, said collector of said first field effect transistor connected to said variable impedance means; and
said second valve means is a second field effect transistor, said second field effect transistor having a source gate and collector, said source being the input means, said gate being the control means and said collector being the output means, said source of said second field effect transistor connected to said series impedance means at the side of said impedance means opposite the said side connected to said collector of said first field effect transistor; and said gate of said second field effect transistor controlling said second field effect transistor output in response to the output of said first field effect transistor; said second field effect transistor having the collector connected to a load connecting means.

4. The Pi-coupled amplifier of claim 2 wherein said first and second vacuum tube is connected in series with said power supply at DC and signal frequencies.

5. The Pi-coupled amplifier of claim 2 wherein said first and second vacuum tubes are connected in parallel with said DC power supply and in series with the signal.

6. The Pi-coupled amplifier of claim 3 wherein said field effect transistors are connected in series with said power supply at DC.

7. The Pi-coupled amplifier of claim 3 wherein said input means is a parallel tuned circuit including an inductance and a variable tuned capacitor;

said source of said first field effect transistor is connected to said receiving means;

said first impedance means is a resistance;

said collector of said first field effect transistor is connected to said variable impedance means;

said source of said second field effect transistor is connected to said variable impedance means at the side opposite the connector to said connector of said first field effect transistor;

said second impedance means is a resistance; and said output means includes a second variable inductance and a coupling coil inductively coupled to said second variable inductance forming a transformer at said signal frequency.

8. The Pi-coupled amplifier of claim 3 wherein said first and second field effect transistors are connected in parallel with said DC power supply and in series with the signal.

9. A Pi-coupled low-noise amplifier comprising:

at least two successive stages of amplification, each stage having an input and an output;

bias means for each stage;

a variable impedance means, said variable impedance means connected at one end to the output of a first one of the amplifier stages and connected at its other end to the input of a second and successive state of amplification and operatively connecting the two successive states of amplification;

each said amplification stage having a control element, controlling the output of its respective stages in response to a signal impressed on the control element, through said bias means; and a first and second RF bypass means connected between each said control means and ground respectively, and isolating said control means from ground at frequencies below RF whereby said variable impedance means may be adjusted for saturated amplifier operation without incurring feedback oscillation through capacitive coupling between any of the input, output or control elements of each stage.

10. A Pi-coupled low-noise amplifier comprising:

at least two successive stages of amplification, each stage having an input and an output;

a variable impedance means, said variable impedance means connected at one end to the output of the first of said successive amplifier stages and connected at its other end to the input of the second successive state of amplification and operatively connecting the output of said first stage to the input of said second stage;

each said amplification stage having a control element, controlling the output of its respective stage in response to a signal impressed on the control element;

the input of the first one of said successive stages connected directly to an input signal;

an impedance means connected between the input and the control element of said first stage whereby the impedance means biases the control element in response to said input signal;

an impedance means connected between the input and the control element of said second stage whereby the impedance means biases the control element in response to the signal at the output of said first stage; and a first and second RF bypass means connected to said control element of the first and second stages, respectively, and connecting said control elements to ground at RF frequencies and isolating the control element from ground to frequency less than RF whereby said variable impedance can be adjusted for lowest noise at the outputs of said amplifier stages without incurring feedback instability.

* * * * *